United States Patent [19]

Ishizuka et al.

[11] Patent Number: 4,918,544
[45] Date of Patent: Apr. 17, 1990

[54] MULTI-SPINDLE SYNCHRONIZATION CONTROL SYSTEM FOR MAGNETIC DISK APPARATUS

[75] Inventors: Hiromi Ishizuka; Takashi Machida, both of Tokyo, Japan

[73] Assignee: NEC Corporation, Tokyo, Japan

[21] Appl. No.: 207,984

[22] Filed: Jun. 17, 1988

[30] Foreign Application Priority Data

Jun. 17, 1987 [JP] Japan ................................ 62-151797
Jun. 17, 1987 [JP] Japan ................................ 62-151798

[51] Int. Cl.$^4$ ........................................... G11B 19/28
[52] U.S. Cl. .................................. 360/73.03; 360/15
[58] Field of Search ........................... 360/73.01, 73.03

[56] References Cited

U.S. PATENT DOCUMENTS 4,618,897 10/1986 Johnson et al. ..................... 360/15
4,809,119 2/1989 Tsuyuguchi et al. ............. 360/73.03

FOREIGN PATENT DOCUMENTS 59-218672 12/1984 Japan .

Primary Examiner—John H. Wolff
Attorney, Agent, or Firm—Sughrue, Mion, Zinn, Macpeak & Seas

[57] ABSTRACT

A multi-spindle synchronization control system for a magnetic disk apparatus includes a plurality of magnetic disk units each for receiving a reference clock pulse to control rotation of a spindle motor and detecting rotation of the spindle motor to generate an index pulse, a crystal oscillator for generating a master clock having a predetermined frequency, a counter for converting the master clock into a master index pulse generated upon each rotation of the spindle motor, and a plurality of spindle synchronization control circuits, each connected to a corresponding one of the plurality of magnetic disk units, for detecting a timing relationship between the master index pulse and the index pulse from the corresponding magnetic disk unit, omitting some pulses of the master clock in accordance with the detection result, and counting down the partially-omitted pulse train to output the reference clock pulse.

4 Claims, 6 Drawing Sheets

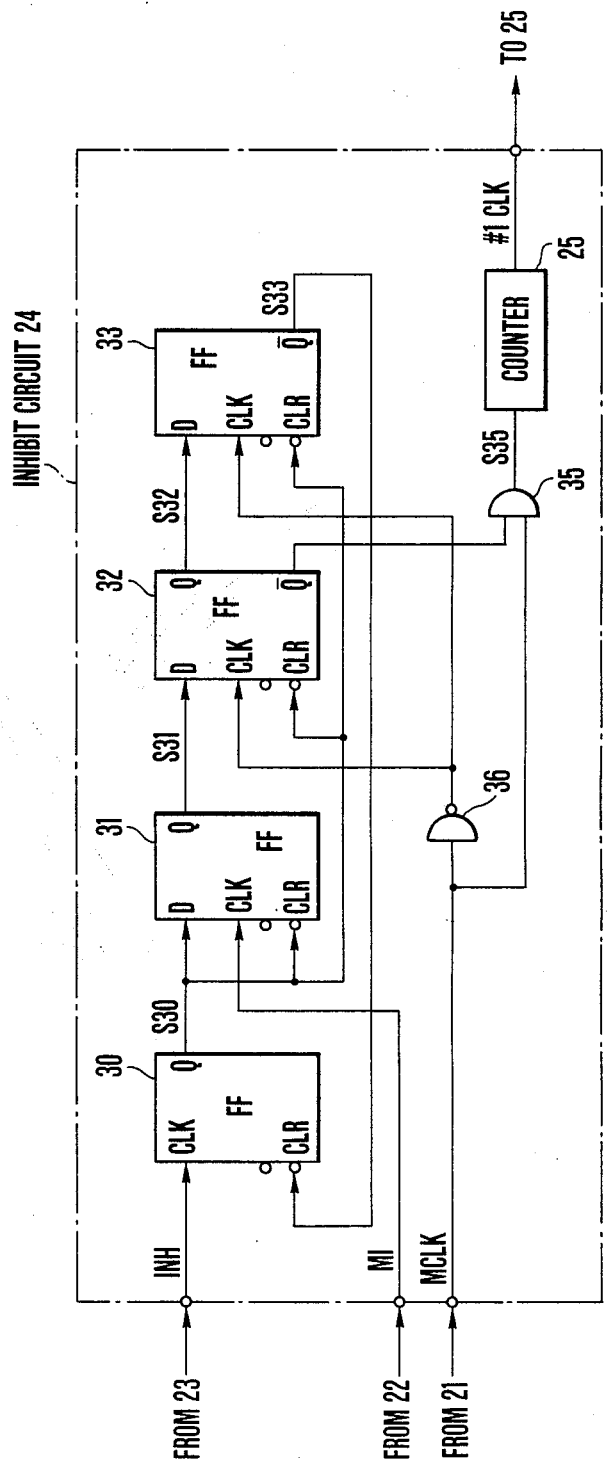
F I G. 4

MULTI-SPINDLE SYNCHRONIZATION CONTROL SYSTEM FOR MAGNETIC DISK APPARATUS

BACKGROUND OF THE INVENTION

The present invention relates to a multi-spindle synchronization control system, connected to a plurality of magnetic disk units, for controlling spindle motors such that timings at which servo heads of the respective magnetic disk units pass through indexes coincide with each other.

In a conventional spindle motor control system for a magnetic disk apparatus, an output signal from a crystal oscillator is counted, and the count is decoded by a decoder for detecting upper and lower limits of the rotation speed of a spindle motor, thereby controlling the rotation speed of each spindle motor. In addition, phase control is performed by accelerating or decelerating the spindle motor in accordance with a phase relationship between a pulse generated at the center of a sector counter and a synchronizing signal input from an external controller so that the index pulse coincides with the synchronizing signal from the external controller (see Japanese Patent Laid-Open No. 59-218672).

In the above conventional spindle motor control system for a magnetic disk apparatus, speed control is performed for each spindle motor within the range of upper and lower limits of the rotation speed of the spindle motor, and then synchronization between the respective spindle motors is controlled. Therefore, the rotation speeds of the plurality of spindle motors differ from each other and variations in rotation speed also differ from each other because loads acting on the motors are different. Therefore, it is difficult to maintain the rotation speeds and the phases of the plurality of spindle motors coincident with each other for a long period of time.

SUMMARY OF THE INVENTION

It is, therefore, an object of the present invention to provide a multi-spindle synchronization control system which eliminates the above drawback of the conventional technique and can easily and accurately synchronize a plurality of magnetic disk units.

According to an aspect of the present invention, there is provided a multi-spindle synchronization control system for a magnetic disk apparatus, comprising a magnetic disk unit having a magnetic disk rotated by a spindle motor, output means for detecting rotation of the spindle motor and outputting an index pulse, and control means for controlling rotation of the spindle motor by a control signal, signal generator means for generating a signal of a predetermined frequency, first counter means for counting down the signal outputs from the signal generator means into a master index pulse generated upon each rotation of the spindle motor, pulse interval discriminator means for detecting a time interval between the master index pulse and the index pulse output from the magnetic disk unit and comparing the time interval with a reference interval, inhibit means for inhibiting the output signal from the signal generator means for a time interval corresponding to the number of periods determined by an output from the pulse interval discriminator means, and second counter means for counting down outputs from the inhibit means and supplying the outputs as the control signal to the magnetic disk unit.

According to another aspect of the present invention, there is provided a multi-spindle synchronization control system for a magnetic disk apparatus, comprising a magnetic disk unit having a magnetic disk rotated by a spindle motor, output means for detecting rotation of the spindle motor and outputting an index pulse, and control means for controlling rotation of the spindle motor by a control signal, signal generator means for generating a pulse signal of a predetermined frequency, first counter means for counting down the pulse signals output from the signal generator means into a master index pulse generated upon each rotation of the spindle motor, first pulse width converter means for converting the master index pulse into a pulse having a first pulse width, second pulse width converter means for converting the master index pulse into a pulse having a second pulse width, a flip-flop for discriminating a timing relationship between an output from the second pulse width converter means and the index pulse supplied from the magnetic disk unit, a group of gate circuits for receiving an output from the flip-flop, an output from the first pulse width converter means, and an output from the signal generator means, and a counter for counting down outputs from the group of gate circuits and outputting the control signal to the magnetic disk unit.

BRIEF DESCRIPTION OF THE DRAWINGS

FIG. 4 is a block diagram showing another part of the circuit shown in FIG. 1 in detail;

DETAILED DESCRIPTION OF THE PREFERRED EMBODIMENTS

Embodiments of the present invention will be described in detail below with reference to the accompanying drawings.

Figure 1:
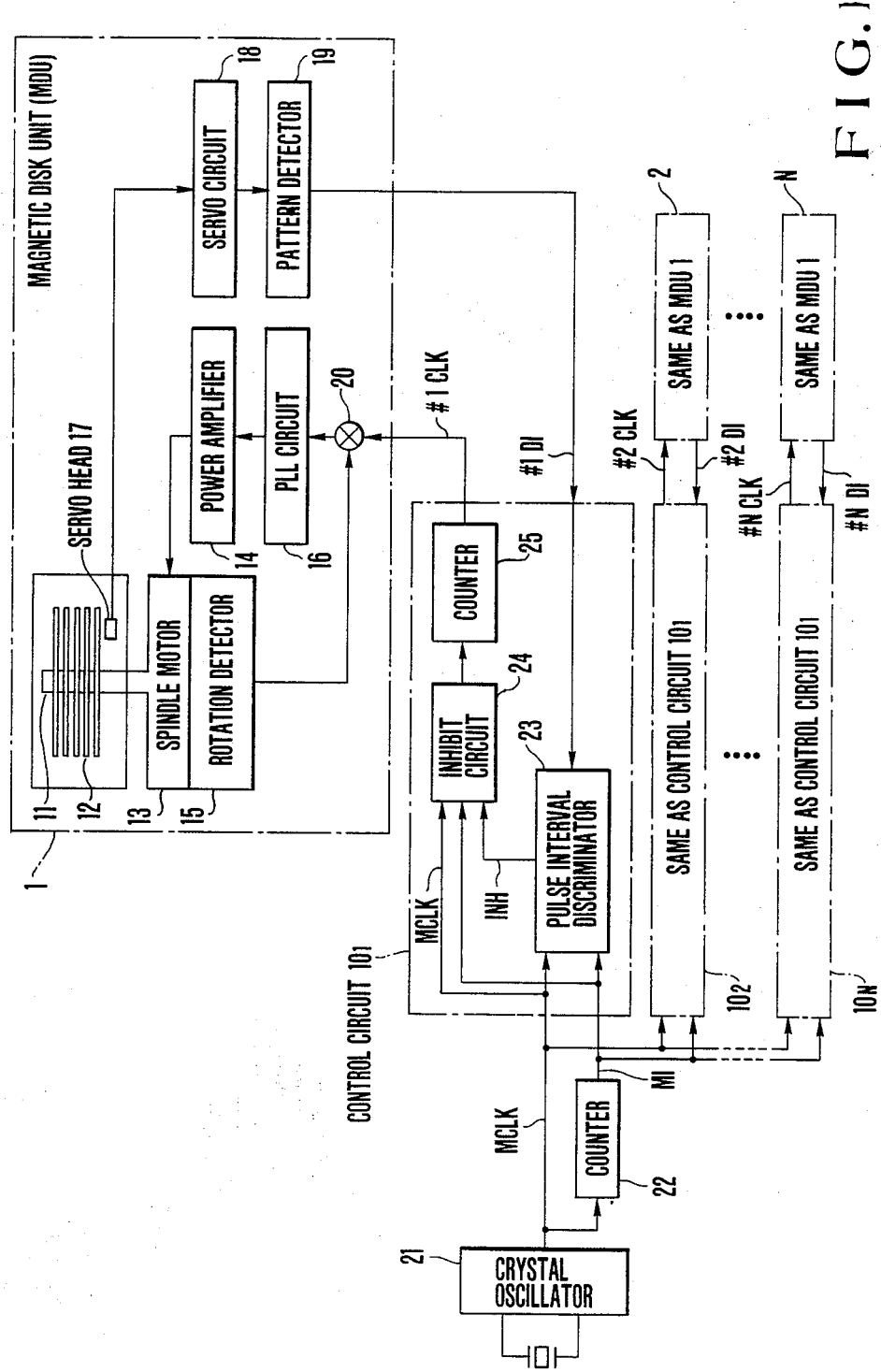
FIG. 1 is a block diagram showing an arrangement of an embodiment of the present invention.

FIG. 1 is a block diagram showing an arrangement of one embodiment of the present invention.

In FIG. 1, each of N magnetic disk units 1 to N having the same arrangement is connected to a corresponding one of control circuits $10_1$ to $10_N$. The N control circuits $10_1$ to $10_N$ constitute a multi-spindle synchronization control circuit as a whole.

In a magnetic disk unit 1, a plurality of magnetic disks 12 mounted on a spindle 11 are rotated by a spindle motor 13. Rotation of the spindle motor 13 is controlled by an output signal from a power amplifier 14 for driving the spindle motor, and a rotation state of the spindle motor 13 is detected by a rotation detector 15. The rotation detector 15 outputs a plurality of pulse trains synchronized with rotation of the spindle motor 13. The power amplifier 14 is controlled by a PLL (Phase Locked Loop) circuit 16 for controlling the rotation speed of the spindle motor. A servo head 17 reads a servo pattern (not shown) written on the servo surface of the magnetic disk 12 and supplies the read signal to a pattern detector 19 through a servo circuit 18. The pattern detector 19 outputs a disk index pulse #1DI to the corresponding control circuit $10_1$ on the basis of the above input signal. Similarly, each of index pulses #2DI to #NDI output from the other magnetic disk units 2 to N, respectively, is output to a corresponding one of the control circuits $10_2$ to $10_N$.

Additionally, in the system including the plurality of magnetic disk units 1 to N, even if the rotation speeds of the magnetic disk units 1 to N coincide with each other, their phases do not coincide with each other. Therefore, output timings of the index pulses #1DI to #NDI do not coincide with each other.

In FIG. 1, an output pulse signal from a crystal oscillator 21, i.e., a master clock pulse MCLK is commonly supplied to a counter 22 and the control circuits $10_1$ to $10_N$. In general, the frequency of the master clock MCLK is 100,000 times or more of the rotational frequency of the spindle motor 13. The counter 22 counts down the output pulse signals MCLK from the crystal oscillator 21 and outputs a pulse i.e., a master index pulse MI upon each rotation of the spindle motor 13. The master index pulse MI is commonly supplied to the control circuits $10_1$ to $10_N$ as a reference timing of the index pulses #1DI to #NDI of the magnetic disk units 1 to N.

In the control circuit $10_1$, a pulse interval discriminator 23 detects a time interval T between the master index pulse MI and the index pulse #1DI of the magnetic disk unit 1, discriminates whether the time interval T falls within the range of a desired time interval from $T_0-\Delta T$ to $T_0+\Delta T$. If the time interval T falls outside the range, the pulse interval discriminator 13 outputs an inhibit pulse INH to an inhibit circuit 24.

The inhibit circuit 24 receives the master index MI and the inhibit pulse INH and inhibits the master clock MCLK for a time interval corresponding to a desired number of periods.

The control circuits $10_2$ to $10_N$ operate similarly to the control circuit $10_1$.

Figure 2:
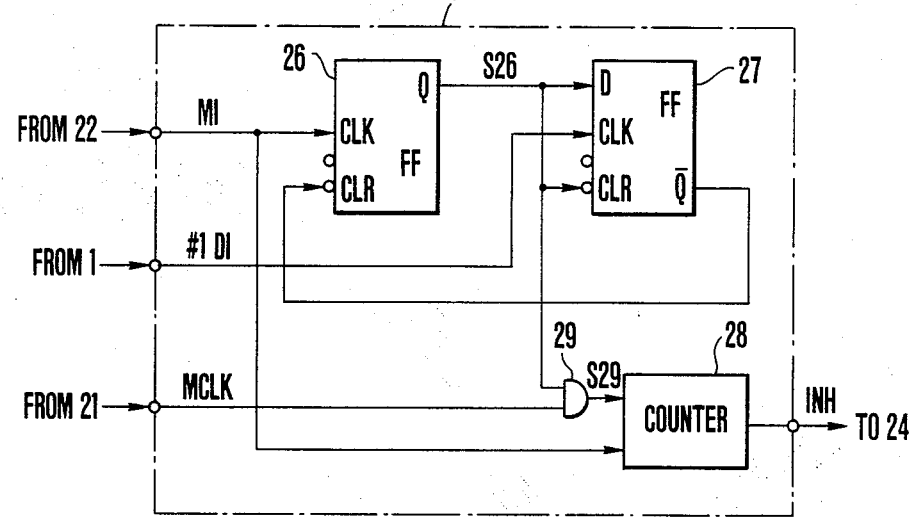
FIG. 2 is a block diagram showing part of the circuit shown in FIG. 1 in detail.

FIG. 2 shows an embodiment of the pulse interval discriminator 23 shown in FIG. 1, and FIGS. 3(A) to 3(F) show a timing relationship between waveforms of main signals in the circuit shown in FIG. 2.

Figure 3:
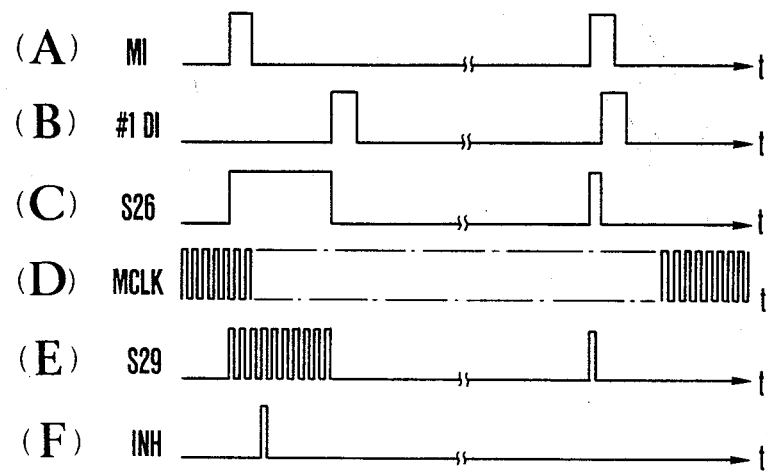
FIGS. 3(A) to 3(F) are timing charts showing a timing relationship between signal waveforms of the circuit shown in FIG. 2.

The master index pulse MI shown in FIG. 3(A) is supplied to the clock (CLK) terminal of a flip-flop (to be referred to as an FF hereinafter) 26. The index pulse #1DI of the magnetic disk unit 1 shown in FIG. 3(B) is supplied to the clock terminal of an FF 27. The master clock MCLK shown in FIG. 3(D) is supplied to one input terminal of an AND gate 29. An output S26 (FIG. 3(C)) from a Q terminal of the FF 26 is supplied to the data (D) and clear (CLR) terminals of the FF 27 and the other input terminal of the AND gate 29. The $\overline{Q}$ output terminal of the FF 27 is connected to the clear terminal of the FF 26. The active pulse S26 is obtained only for a time interval from a leading edge of the master index pulse MI to a leading edge of the index pulse #1DI of the magnetic disk unit. By masking the master clock pulse MCLK by the AND gate 29 using the pulse S26, a signal S29 as shown in FIG. 3(E) is obtained.

The masked master clock pulses MCLK between the master index pulses MI are counted by a counter 28. When the count falls outside a predetermined range, the counter 28 outputs an inhibit pulse INH.

FIG. 4 shows an embodiment of the inhibit circuit 24 shown in FIG. 1. FIGS. 5(A) to 5(I) show a timing relationship between signal waveforms of the circuit shown in FIG. 4.

Figure 5:
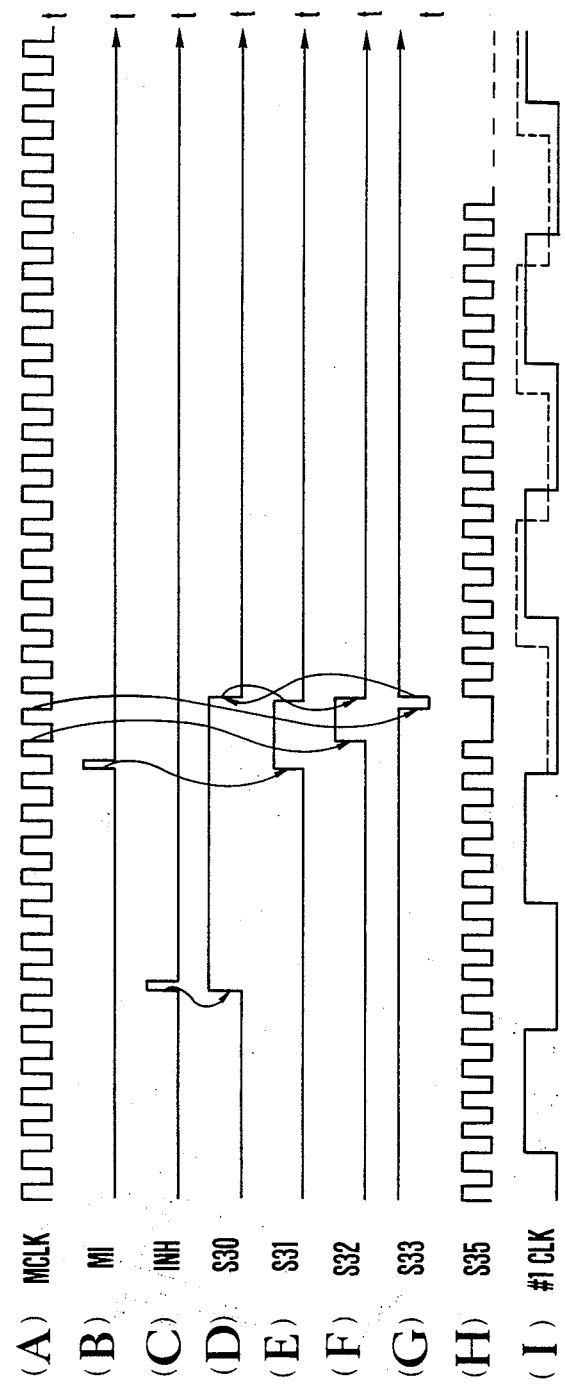
FIGS. 5(A) to 5(I) are timing charts showing a timing relationship between signal waveforms of the circuit shown in FIG. 4.

In FIG. 4, an inhibit pulse INH shown in FIG. 5(C) is supplied to the clock terminal of an FF 30. A master index pulse MI shown in FIG. 5(B) is supplied to the clock terminal of an FF 31. A master clock pulse MCLK shown in FIG. 5(A) is supplied as a clock to the clock terminals of FFs 32 and 33 through a NAND gate 36. An output S30 (FIG. 5(D)) from a Q terminal of the FF 30 is supplied to the data terminal of the FF 31 and the clear terminals of the FFs 31, 32, and 33. An output S31 (FIG. 5(E)) from a Q terminal of the FF 31 is supplied to the data terminal of the FF 32. An output S32 (FIG. 5(F)) from a Q terminal of the FF 32 is supplied to the data terminal of the FF 33. An output S33 (FIG. 5(G)) from a $\overline{Q}$ terminal of the FF 33 is supplied to the clear terminal of the FF 30. The output S32 (FIG. 5(F)) of the FF 32 and the master clock pulse MCLK are supplied to a gate 35. As a result, a pulse train S35 (FIG. 5(H)) obtained by removing only one pulse from a train of the master clock pulses MCLK is obtained.

The number of pulses to be inhibited, i.e., a pulse interval can be changed stepwise by counting down the master clocks MCLK or by increasing the number of stages of FFs. Pulses of the train from which a certain number of pulses are removed are counted down by a counter 25 and input as a reference clock pulse #1CLK of the PLL circuit 16. Since the phase of the reference clock pulse #1CLK of the PLL circuit 16 is delayed by a time interval corresponding to the number of inhibited pulses, the rotation phase of a section to be controlled, i.e., the spindle motor 13 of the magnetic disk unit 1 is delayed by an operation of the PLL circuit 16. That is, by controlling the phase of the reference clock pulse #1CLK of the PLL circuit 16 by the above means, the rotation phase of the spindle motor 13 can be controlled.

The magnetic disk units 2 to N can be similarly controlled.

As described above, according to the this embodiment, an arbitrary number of clock pulses are inhibited in a higher frequency region than a reference clock pulse of the spindle motor rotation control PLL circuit, thereby delaying the phase of the reference clock pulse. As a result, synchronous driving can be effectively performed such that servo heads of a plurality of magnetic disk units pass through their indexes at the same time.

Figure 6:
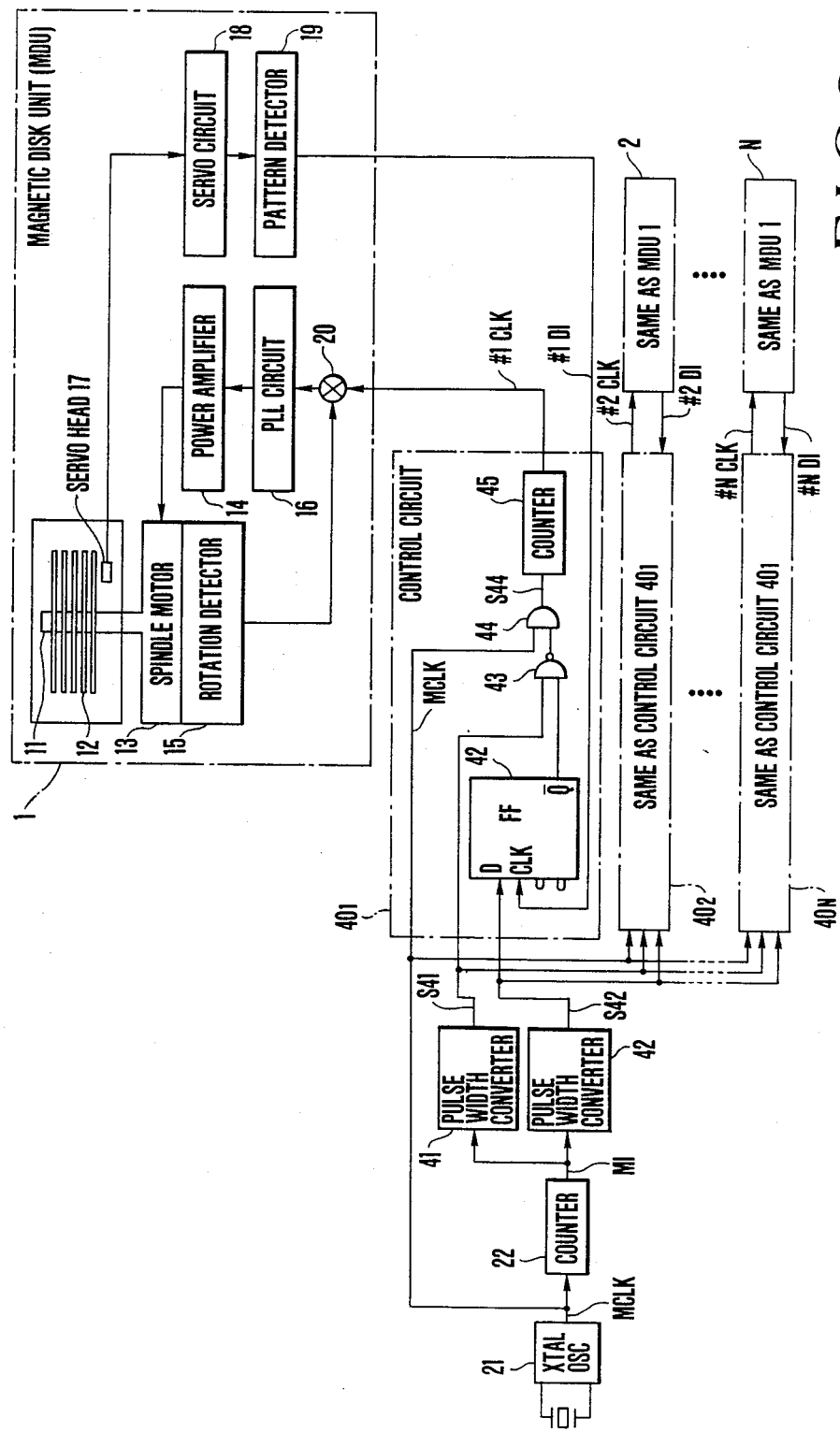
FIG. 6 is a block diagram showing an arrangement of another embodiment of the present invention.

FIG. 6 is a block diagram showing another embodiment of the present invention, and FIGS. 7(A) to 7(G) are timing charts showing signal waveforms of the circuit shown in FIG. 6.

In FIG. 6, the same reference numerals as in FIG. 1 denote the same parts and signals, and a detailed description thereof will be omitted.

In FIG. 6, control circuits $40_1$, $40_2$, ..., $40_N$ are provided in correspondence to magnetic disk units 1, 2, ..., N. The control circuits $40_1$ to $40_N$ constitute a multi-spindle synchronization control circuit as a whole.

Figure 7:
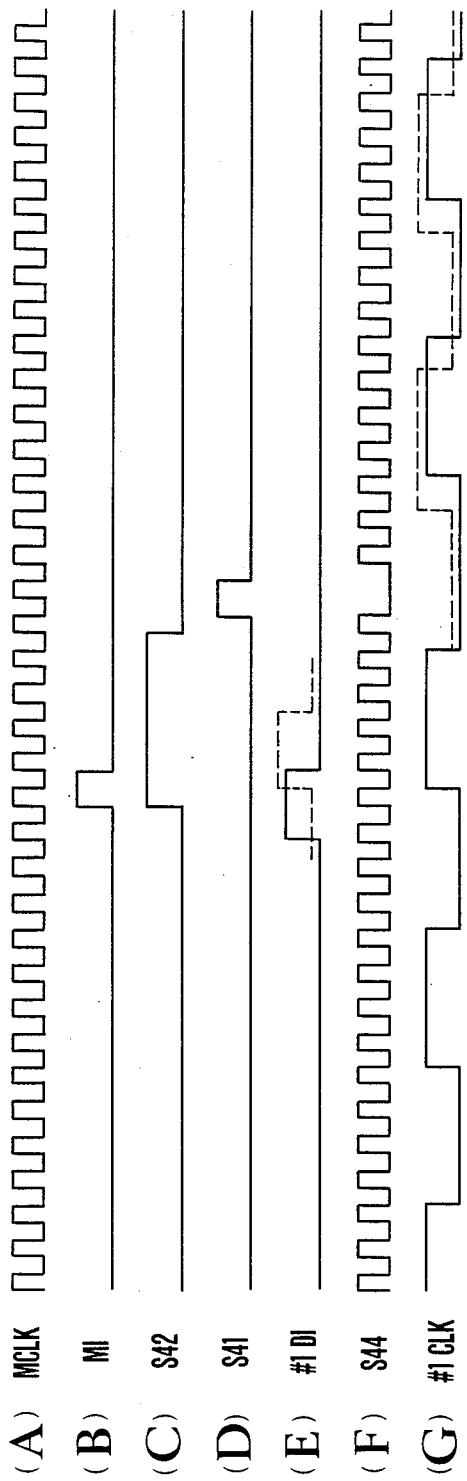
FIGS. 7(A) to 7(G) are timing charts showing a timing relationship between signal waveforms of the circuit shown in FIG. 6.

An output pulse signal MCLK shown in FIG. 7(A) from a crystal oscillator 21 is supplied to a counter 22 and parallelly to the control circuits $40_1$ to $40_N$. The counter 22 counts down the output pulse signals MCLK from the crystal oscillator 21, and outputs a master index pulse MI shown in FIG. 7(B) which is generated upon each rotation of a spindle motor 13. The master index MI serves as a reference timing for index pulses #1DI to #NDI of the magnetic disk units 1 to N. The master index pulse MI is supplied to pulse width converters 41 and 42, converted into signals S41 and S42 having pulse widths shown in FIGS. 7(D) and 7(C), respectively, and then supplied to the control circuits $40_1$ to $40_N$. Each of the control circuits $40_1$ to $40_N$ has an FF 42, a NAND gate 43, an AND gate 44, and a counter 45. An operation of the control circuit $40_1$ will be described below. Operations of the other control circuits $40_2$ to $40_N$ are the same as that of the control circuit $40_1$.

An output from the pulse width converter 42 is supplied to the data terminal of the FF 42. The disk index pulse #1DI from the magnetic disk unit 1 is supplied to the clock terminal of the FF 42. A $\bar{Q}$ output from the FF 42 is supplied to one terminal of the NAND gate 43. If a leading edge of a pulse of the input signal #1DI to the CLK terminal is not present when the input signal S42 to the data terminal is at high level ("H"), a Q output from the FF 42 goes to "H", thereby enabling the NAND gate 43.

The pulse width of the output S41 from the pulse width converter 41 corresponds to a desired number of successive master clock pulses MCLK. The signal S41 is supplied to the other terminal of the NAND gate 43. An output from the NAND gate 43 and the master clock pulse MCLK are supplied to the AND gate 44. Outputs from the AND gate 44 are supplied to and counted down by the counter 45 and then output to the magnetic disk unit 1. If a leading edge of the disk index pulse #1DI is not present when the output S42 from the pulse width converter 42 is "H", the output S44 from the AND gate 44 form a pulse train obtained by inhibiting a desired number of successive pulses of a train of the master clock pulses MCLK as shown in FIG. 7(F). When the signals S44 are counted down, an output from the counter 45, i.e., the phase of the reference clock #1CLK of the PLL circuit 16 is delayed as shown in FIG. 7(G). Therefore, the phase of rotation of the spindle motor 13 is shifted by an amount corresponding to the delay amount. That is, the timing at which the index pulse #1DI of the magnetic disk unit 1 is generated is changed as represented by a dotted line in FIG. 7(E). By repeatedly performing the above operation, the timings of the master index pulse MI and the disk index pulse #1DI coincide with each other. When the operation is similarly performed to the other magnetic disk units 1 to N, timings of the indexes of all the magnetic disk units coincide with each other.

As described above, according to this embodiment, an arbitrary number of clock pulses are inhibited in a frequency region higher than the reference clock pulse of the spindle motor rotation control PLL circuit, thereby delaying the phase of the reference clock pulse. As a result, synchronous drive can be effectively performed such that the timings of indexes of a plurality of magnetic disk units coincide with each other.

What is claimed is:

1. A spindle motor synchronization control system for a magnetic disk apparatus, comprising:
   a magnetic disk unit having a magnetic disk rotated by a spindle motor, output means for detecting rotation of said spindle motor and outputting an index pulse, and control means for controlling rotation of said spindle motor by a control signal;
   signal generator means for generating a signal of a predetermined frequency;
   first counter means for counting down the signal outputs from said signal generator means into a master index pulse generated upon each rotation of said spindle motor;
   pulse interval discriminator means for detecting a time interval between the master index pulse and the index pulse output from said magnetic disk unit and comparing the time interval with a reference interval;
   inhibit means for inhibiting the output signal from said signal generator means for a time interval corresponding to the number of periods determined by an output from said pulse interval discriminator means; and
   second counter means for counting down outputs from said inhibit means and supplying the outputs as the control signal to said control means of said magnetic disk unit, said control means changing the rotational speed of said spindle motor in response to said control signal until said time interval becomes shorter than said reference interval.

2. A spindle motor synchronization control system for a magnetic disk apparatus, comprising:
   a magnetic disk unit having a magnetic disk rotated by a spindle motor, output means for detecting rotation of said spindle motor and outputting an index pulse, and control means for controlling rotation of said spindle motor by a control signal;
   signal generator means for generating a pulse signal of a predetermined frequency;
   first counter means for counting down the pulse signals output from said signal generator means into a master index pulse generated upon each rotation of said spindle motor;
   first pulse width converter means for converting the master index pulse from said first counter means into a pulse having a first pulse width;
   second pulse width converter means for converting the master index pulse from said first counter means into a pulse having a second pulse width;
   a flip-flop for discriminating a timing relationship between an output from said second pulse width converter means and the index pulse supplied from said magnetic disk unit;
   a group of gate circuits for receiving an output from said flip-flop, an output from said first pulse width converter means, and an output from said signal generator means; and
   a second counter means for counting down outputs from said group of gate circuits and outputting the control signal to said control means of said magnetic disk unit, said control means changing the rotational speed of said spindle motor in response to said control signal until said time interval becomes shorter than said reference interval.

3. A synchronization control system for plural spindle motors, comprising:
   a plurality of magnetic disk units each having a magnetic disk rotated by one of said spindle motors, output means for detecting rotation of said one of said spindle motors and outputting an index pulse, and control means for controlling rotation of said spindle motor by a control signal;
   master clock signal generator means for generating master clock pulses of a predetermined frequency;

first counter means for counting down the master clock pulses into master index pulses generated upon each rotation of said spindle motor; and a plurality of spindle motor synchronization controller means, corresponding to said plurality of magnetic disk units, each for receiving the master clock pulses from said master clock signal generator means, the master index pulses from said first counter means, and an index pulse output from a corresponding one of said magnetic disk units and outputting the control signal to said corresponding magnetic disk unit, wherein each of said plurality of spindle motor synchronization controller means comprises pulse interval discriminator means for detecting a time interval between the master index pulse and the corresponding index pulse and comparing the time interval with a reference interval, inhibit means for inhibiting the master clock pulses by a time interval corresponding to the number of periods determined by an output from said pulse interval discriminator means, and second counter means for counting down the outputs from said inhibit means and outputting the control signal.

4. A synchronization control system for plural spindle motors, comprising:

a plurality of magnetic disk units each having a magnetic disk rotated by one of said spindle motors, output means for detecting rotation of said one of said spindle motors and outputting an index pulse, and control means for controlling rotation of said spindle motor by a control signal;

master clock signal generator means for generating master clock pulses of a predetermined frequency;

first counter means for counting down the master clock pulses into a master index pulse generated upon each rotation of said spindle motor;

first pulse width converter means for converting the master index pulse into a first pulse having a first pulse width;

second pulse width converter means for converting the master index pulse into a second pulse having a second pulse width; and a plurality of spindle motor synchronization controller mans, corresponding to said plurality of magnetic disk units, each for receiving the master clock pulses, the first pulse, the second pulse, and an index pulse output from a corresponding one of said magnetic disk units and outputting the control signal, wherein each of said plurality of spindle motor synchronization controller means comprises:

a flip-flop circuit for receiving the second pulse and the index pulse and outputting a signal of high level if a leading edge of the index pulse is not present when the second pulse is at high level;

a NAND gate for receiving the first pulse and an output signal from said flip-flop circuit;

an AND gate for receiving the master clock pulses and an output signal from said NAND gate; and second counter means for counting down output signals from said AND gate and outputting the control signal.

* * * * *